US012812649B2

(12) United States Patent
Yang et al.

(10) Patent No.: US 12,812,649 B2
(45) Date of Patent: Nov. 24, 2026

(54) MULTIPLE SCHEDULE REQUEST IN FREQUENCY, CODE DOMAIN

(71) Applicant: QUALCOMM Incorporated, San Diego, CA (US)

(72) Inventors: Ming Yang, San Diego, CA (US); Kausik Ray Chaudhuri, San Diego, CA (US); Juan Montojo, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 244 days.

(21) Appl. No.: 18/764,068

(22) Filed: Jul. 3, 2024

(65) Prior Publication Data

US 2026/0012949 A1 Jan. 8, 2026

(51) Int. Cl.

| | |
|---|---|
| ***H04W 72/21*** | (2023.01) |
| ***H04L 5/00*** | (2006.01) |
| ***H04W 72/231*** | (2023.01) |

(52) U.S. Cl.

CPC ........... *H04W 72/21* (2023.01); *H04L 5/0026* (2013.01); *H04W 72/231* (2023.01)

(58) Field of Classification Search

CPC .... H04L 5/0026; H04L 5/0053; H04W 72/21; H04W 72/231; H04W 72/23; H04W 72/54; H04B 7/04

See application file for complete search history.

(56) References Cited

U.S. PATENT DOCUMENTS

| | | | | |
|---|---|---|---|---|
| 2017/0134117 | A1* | 5/2017 | Tan Bergström | H04L 5/001 |
| 2017/0202009 | A1* | 7/2017 | Kim | H04W 72/21 |
| 2017/0290031 | A1* | 10/2017 | Hwang | H04W 72/23 |
| 2018/0139773 | A1* | 5/2018 | Ma | H04L 27/26025 |
| 2018/0279327 | A1* | 9/2018 | Ying | H04W 72/0446 |
| 2018/0317123 | A1* | 11/2018 | Chen | H04W 72/21 |
| 2019/0357178 | A1* | 11/2019 | Bae | H04L 5/0044 |
| 2024/0224101 | A1* | 7/2024 | Farag | H04W 24/10 |
| 2025/0280408 | A1* | 9/2025 | Shariatmadari | H04W 52/028 |

* cited by examiner

*Primary Examiner* — Brian D Nguyen
(74) *Attorney, Agent, or Firm* — Procopio, Cory, Hargreaves & Savitch LLP

(57) ABSTRACT

A method for wireless communication at a user equipment (UE) and related apparatus are provided. In the method, the UE transmits, for a network entity via physical uplink control channel (PUCCH), multiple scheduling requests (SRs) in a frequency domain or a code domain for an uplink time/frequency resource in the same time slot or different time slots. Each combination of the multiple SRs may indicate a buffer size and a radio frequency condition. The UE further receives a grant of uplink resources. The transport block size, the modulation and coding scheme (MCS), and the multiple-input and multiple-output (MIMO) layer associated with the grant may be based on a combination of the multiple SRs.

20 Claims, 10 Drawing Sheets

200
One Frame (TDD)
10 ms
subframe
slot
RB
subcarrier
OFDM symbol
DMRS R
CSI-RS
D D D D D D D D D D D D F U 230
PDCCH CORESET
SSS
PSS
PDSCH
PBCH
REG 12 REs
1 CCE = 6 REGs
SS/PBCH Block
BWP
20 RBs
channel bandwidth RBs 250
One Frame (TDD)
10 ms
subframe
slot
RB
subcarrier
OFDM symbol
SRS
SRS Comb 0
SRS Comb 1
DMRS R
U U U U U U U U U U U U U U

280
PUCCH
PUSCH

MULTIPLE SCHEDULE REQUEST IN FREQUENCY, CODE DOMAIN

TECHNICAL FIELD

The present disclosure relates generally to communication systems and, more particularly, to wireless communication that includes scheduling requests.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a user equipment (UE). The apparatus may include at least one memory and at least one processor coupled to the at least one memory. Based at least in part on information stored in the at least one memory, the at least one processor, individually or in any combination, may be configured to transmit, for a network entity via physical uplink control channel (PUCCH), multiple scheduling requests (SRs) in a frequency domain or a code domain for an uplink time/frequency resource in the same time slot or different time slots, where each combination of the multiple SRs indicates a buffer size and a radio frequency condition; and receive a grant of uplink resources. The transport block size, the modulation and coding scheme (MCS), and the multiple-input and multiple-output (MIMO) layer associated with the grant are based on a combination of the multiple SRs.

In an aspect of the disclosure, a method, a computer-readable medium, and an apparatus are provided for wireless communication at a network entity. The apparatus may include at least one memory and at least one processor coupled to the at least one memory. Based at least in part on information stored in the at least one memory, the at least one processor, individually or in any combination, may be configured to receive, from a UE via PUCCH, multiple SRs in a frequency domain or a code domain for an uplink time/frequency resource in the same time slot or different time slots, where each combination of the multiple SRs indicates a buffer size and a radio frequency condition; and transmit a grant of uplink resources. The transport block size, the MCS, and the MIMO layer associated with the grant is based on a combination of the multiple SRs.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
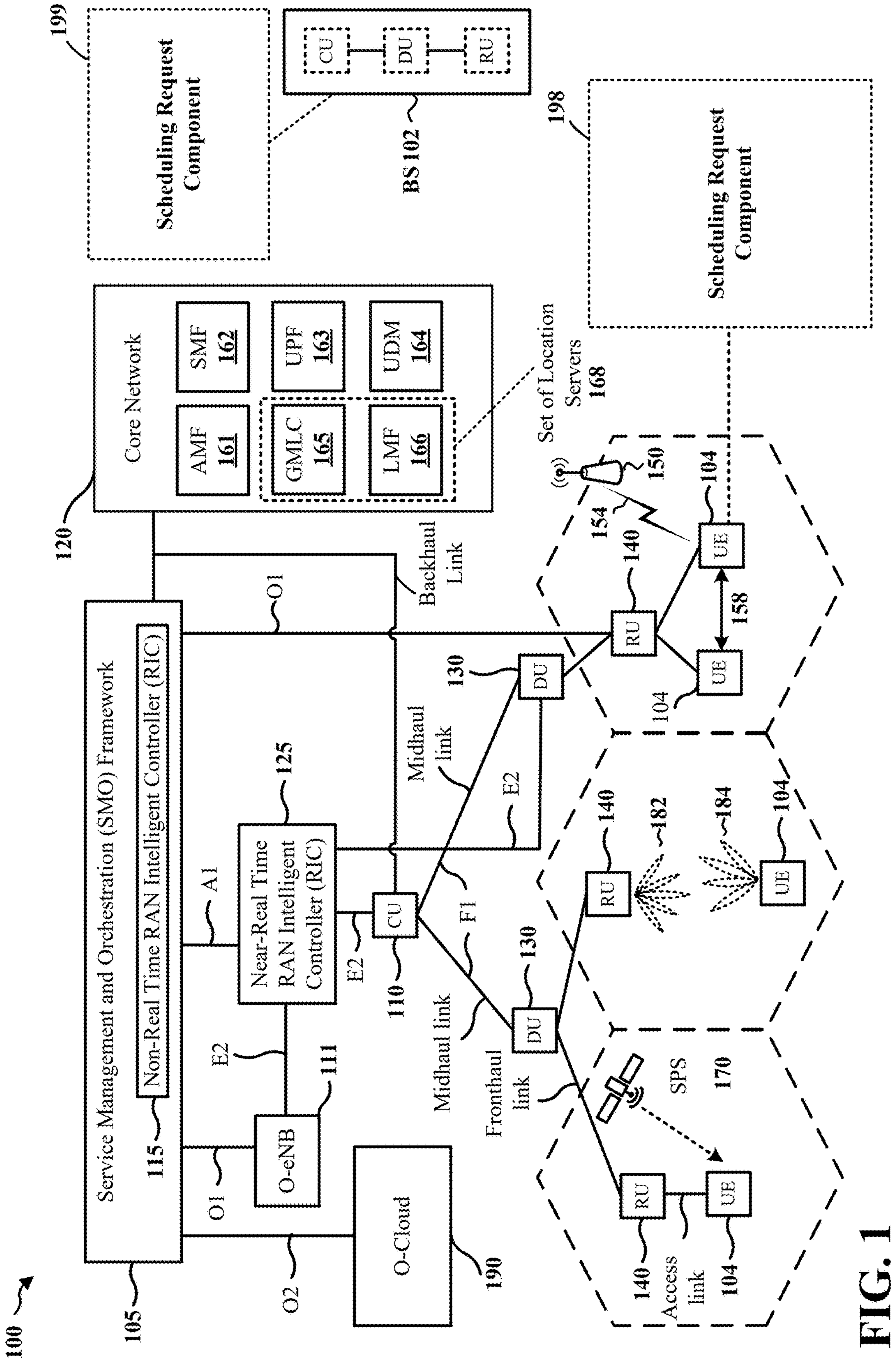
FIG. 1 is a diagram illustrating an example of a wireless communication system and an access network.

In wireless communication, a scheduling request (SR) can be indicated as a bit flag that can be transmitted by a device to request uplink resources from the uplink scheduler. As an example, a UE may transmit the SR to a base station to request an allocation of uplink resources from the base station, which the UE can use to transmit an uplink transmission. The SR can be transmitted on the physical uplink control channel (PUCCH) in a user equipment (UE) dedicated SR occasion. Multiple scheduling requests may be provided from a single device (e.g., a UE), where a logical channel may be associated with one or more scheduling request configurations. This capability provides the network with not only the information that data are awaiting transmission from the device (e.g., the UE) but may also indicate the type of data that is pending. However, wireless data traffic can be bursty and may vary significantly in size. When the network receives an SR from a UE, it lacks information about the burst size, which may result in an allocation that is too large or too small for the burst package size. Such mismatches can lead to a high percentage of padding or the use of multiple UL grants to complete the transmission, both of which can significantly increase latency and affect the user experience. Example aspects presented herein provide methods and apparatus to define multiple SR occasions such that the different occasions may encode information about the UE buffer size to facilitate the allocation of uplink resources.

Various aspects relate generally to wireless communication. Some aspects more specifically relate to the utilization of multiple scheduling requests in wireless communication. In some examples, a UE transmit, for a network entity via PUCCH, multiple SRs in a frequency domain or a code domain for an uplink time/frequency resource in the same time slot or different time slots. Each combination of the multiple SRs may indicate a buffer size and a radio frequency condition. The UE further receives a grant of uplink resources. The transport block size, the MCS, and the multiple-input and multiple-output (MIMO) layer associated with the grant may be based on a combination of the multiple SRs. In some examples, the multiple SRs may be located on multiple SR occasions in the frequency domain with different physical resource blocks (PRBs) or the code domain with different phase rotations. In some examples, the multiple SRs may be respectively in multiple PRBs with a buffer size indication. In some examples, the multiple SRs may indicate one of a first buffer size with a first power headroom, the first buffer size with a second power headroom different from the first power headroom, a second buffer size that is larger than the first buffer size and with the first power headroom, or the second buffer size with the second power headroom.

Particular aspects of the subject matter described in this disclosure can be implemented to realize one or more of the following potential advantages. In some examples, by enabling UE to send enhanced SRs that include information about buffer size and radio frequency (RF) conditions, such as power headroom report (PHR) indications on the PUCCH, the described techniques allow the network to allocate the uplink grant more accurately, thereby improving the efficiency of resources utilization and reducing the latency. In some examples, with the indication of buffer size and RF conditions, the network can allocate the exact amount of resources needed, avoiding the common issue of over or under-allocating PRBs, which may result in high padding rates or the need for multiple uplink grants.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. When multiple processors are implemented, the multiple processors may perform the functions individually or in combination. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor (s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (CNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUS 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (IFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-cNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via 01) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHZ (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth™ (Bluetooth is a trademark of the Bluetooth Special Interest Group (SIG)), Wi-Fi™ (Wi-Fi is a trademark of the Wi-Fi Alliance) based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHZ-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include the scheduling request component 198. The scheduling request component 198 may be configured to transmit, for a network entity via physical uplink control channel (PUCCH), multiple scheduling requests (SRs) in a frequency domain or a code domain for an uplink time/frequency resource in the same time slot or different time slots, where each combination of the multiple SRs indicates a buffer size and a radio frequency condition; and receive a grant of uplink resources, where the transport block size, the modulation and coding scheme (MCS), and the MIMO layer associated with the grant are based on the multiple SRs. In certain aspects, the base station 102 may include the scheduling request component 199. The scheduling request component 199 may be configured to receive, from a UE via PUCCH, multiple SRs in a frequency domain or a code domain for an uplink time/frequency resource in the same time slot or different time slots, where each combination of the multiple SRs indicates a buffer size and a radio frequency condition; and transmit a grant of uplink resources, where the transport block size, the MCS, and the MIMO layer associated with the grant is based on the multiple SRs. Although the following description may be focused on 5G NR, the concepts described herein may be applicable to other similar areas, such as LTE, LTE-A, CDMA, GSM, and other wireless technologies.

Figures 2A, 2B, 2C, 2D:
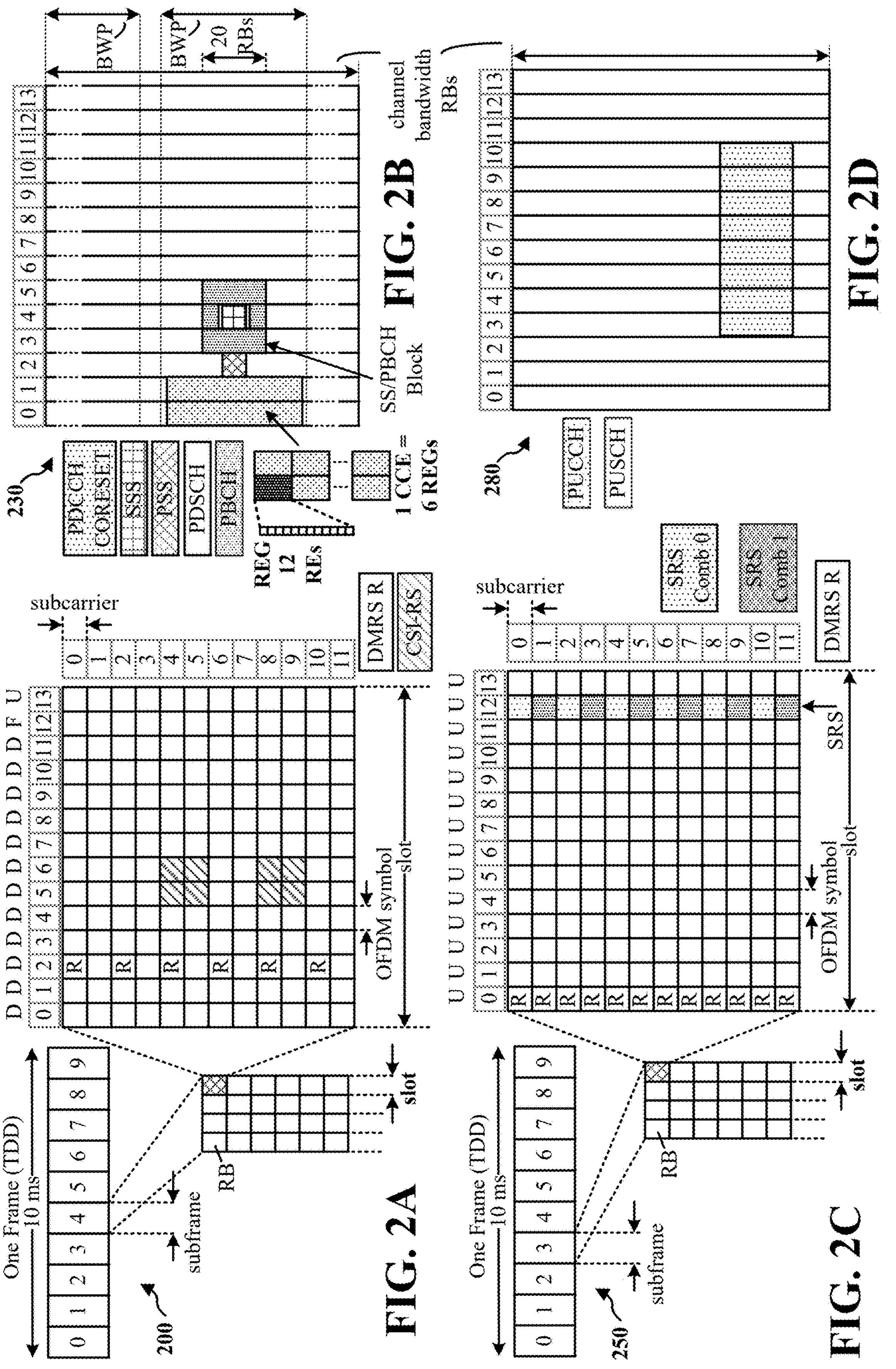
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| μ | SCS $\Delta f = 2^{\mu} \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology u, there are 14 symbols/slot and $2^{\mu}$ slots/subframe. The subcarrier spacing may be equal to $2^{\mu}*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
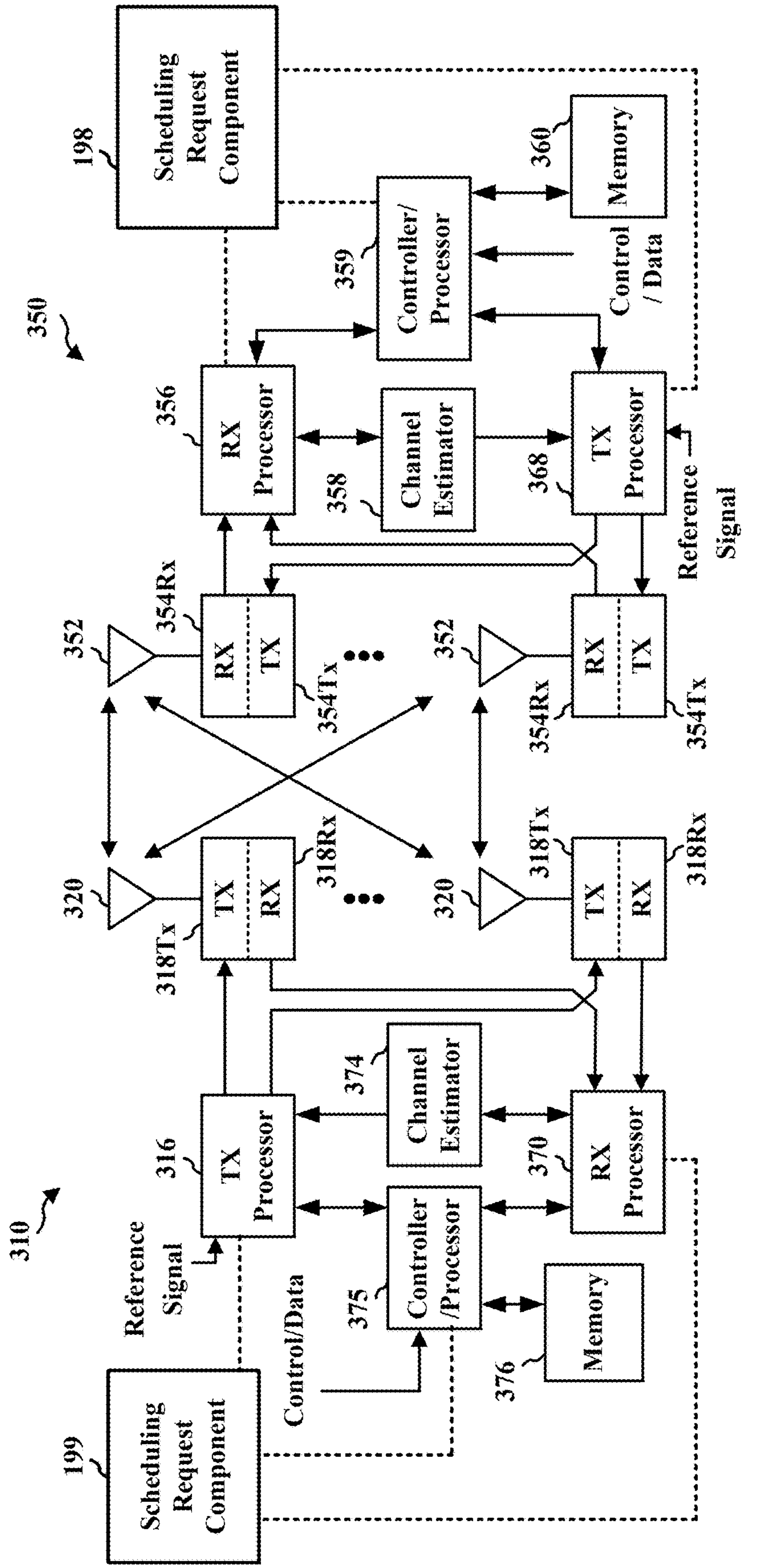
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with at least one memory 360 that stores program codes and data. The at least one memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with at least one memory 376 that stores program codes and data. The at least one memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the scheduling request component 198 of FIG. 1.

At least one of the TX processor 316, the RX processor 370, and the controller/processor 375 may be configured to perform aspects in connection with the scheduling request component 199 of FIG. 1.

The present disclosure provides methods and apparatus to support multiple scheduling request occasions such that the different occasions may encode information, such as information about the UE buffer size or power headroom.

Figure 4:
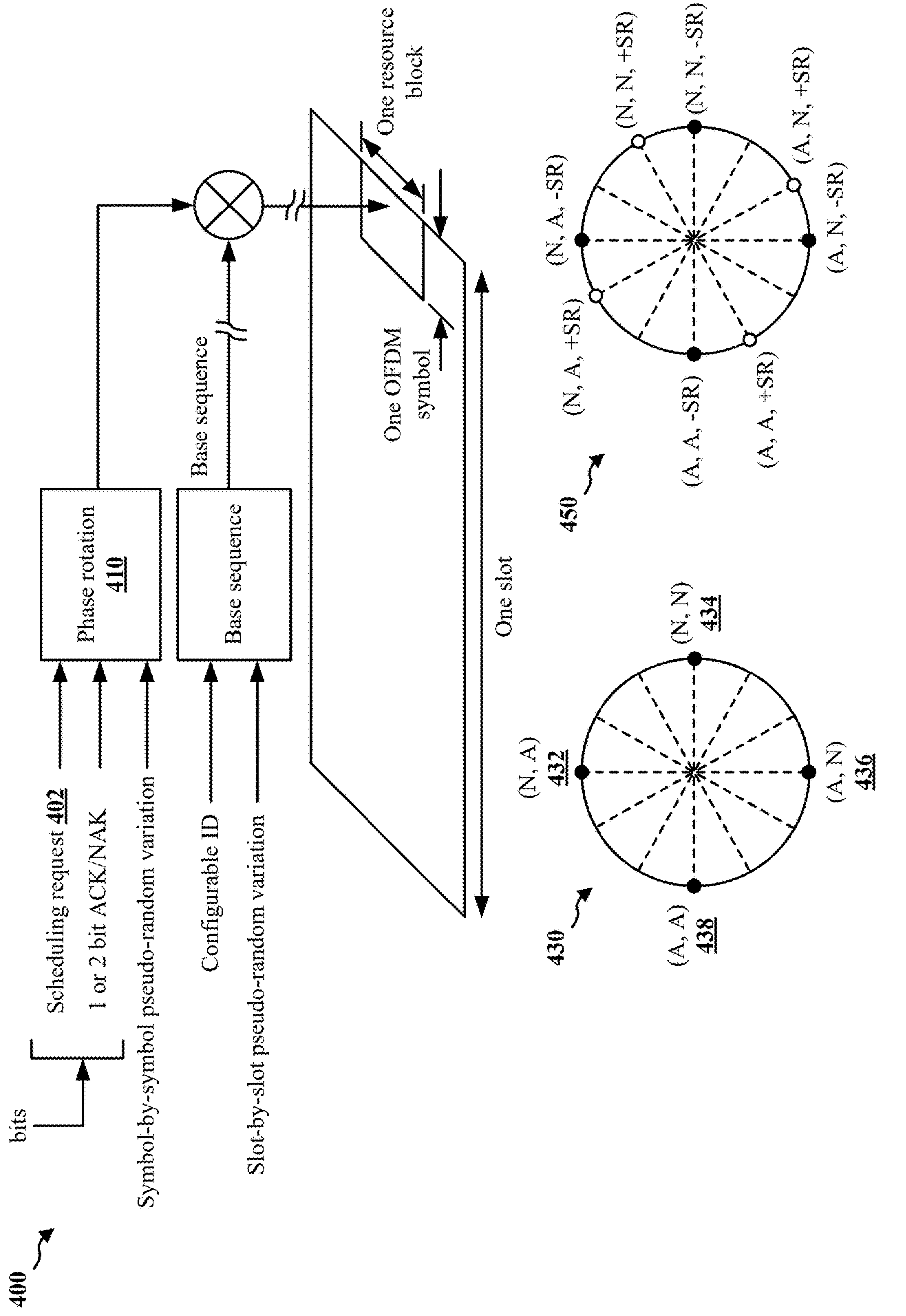
FIG. 4 is a diagram illustrating an example of the transmission of a scheduling request (SR).

In wireless communication, a scheduling request (SR) can be indicated via a bit flag that may be transmitted by a device (e.g., a UE) to request the uplink resources from the uplink scheduler (e.g., a base station). The SR can be transmitted on the physical uplink control channel (PUCCH) in a UE dedicated SR occasion, and each UE may be allocated an SR occasion. As the number of radio resource control (RRC) connected UEs increases, the network may adjust the SR occasion and/or periodicity based on the number of RRC connected UEs to ensure the UEs have sufficient physical resource blocks (PRBs) for the physical uplink shared channel (PUSCH). For example, the network may adjust the SR periodicity from 5 milliseconds (ms) to 10 ms, 20 ms, or even 80 ms as the number of RRC connected UEs increases. This adjustment, however, may lead to increased latency and may negatively impact user experience. FIG. 4 is a diagram 400 illustrating an example of the transmission of an SR. As shown in FIG. 4, UEs may transmit corresponding SRs (e.g., scheduling request 402) using the same PUCCH with different sequences of phase rotations (e.g., via the phase rotation process 410). For example, diagram 430 shows that different phase rotations may correspond to different combinations of acknowledge (A) and negative acknowledge (N). For example, the combination of (N, A) 432, the combination of (N, N) 434, the combination of (A, N) 436, and the combination of (A, A) 438 may be respectively represented via different phase rotations in diagram 430. Diagram 450 shows that the combination of A and N and the scheduling request may be represented by different phase rotations.

In some examples, multiple scheduling requests (SRs) may be configured for a single device, where a logical channel may be associated with zero or more scheduling request configurations. This capability provides the network (e.g., a gNB) with not only the information that data are awaiting transmission from the device but also the type of data that are awaiting transmission.

Some wireless communication traffic, such as commercial traffic, may be bursty (meaning the data transmission occurs in rapid, short bursts) and may vary significantly in size. This bursty characteristic may present challenges in uplink resource management. For example, the number of available uplink slots in the time division duplex (TDD) setting may be limited. When the network (e.g., a gNB) receives an SR from a UE, it may not have information about the burst size, which may result in either an allocation that is too large or too small for the burst package size. Such mismatches may lead to a high percentage of padding or the necessity for multiple uplink grants to complete the transmission, both of which can significantly increase latency and affect user experiences.

Hence, it is desirable that once a burst of data reaches the UE, and the UE sends an SR on the PUCCH, the network (e.g., a base station) may provide a proper size of uplink grant for the UE to complete the transmission of the burst of data efficiently. For example, the proper size of uplink grant may be provided in one uplink grant (instead of multiple uplink grants) that the UE may use to complete the burst data transmission without high levels of padding, as multiple uplink grants may lead to increased latency, especially in TDD configurations where non-consecutive uplink slots are used.

Example aspects presented herein provide methods and apparatus to support multiple scheduling request occasions such that the different occasions may encode information, such as information about the UE buffer size or power headroom. Based on this information, the network may allocate the uplink grant accordingly (e.g., allocate one uplink grant with minimum padding) to improve the efficiency of resource utilization.

Figure 5:
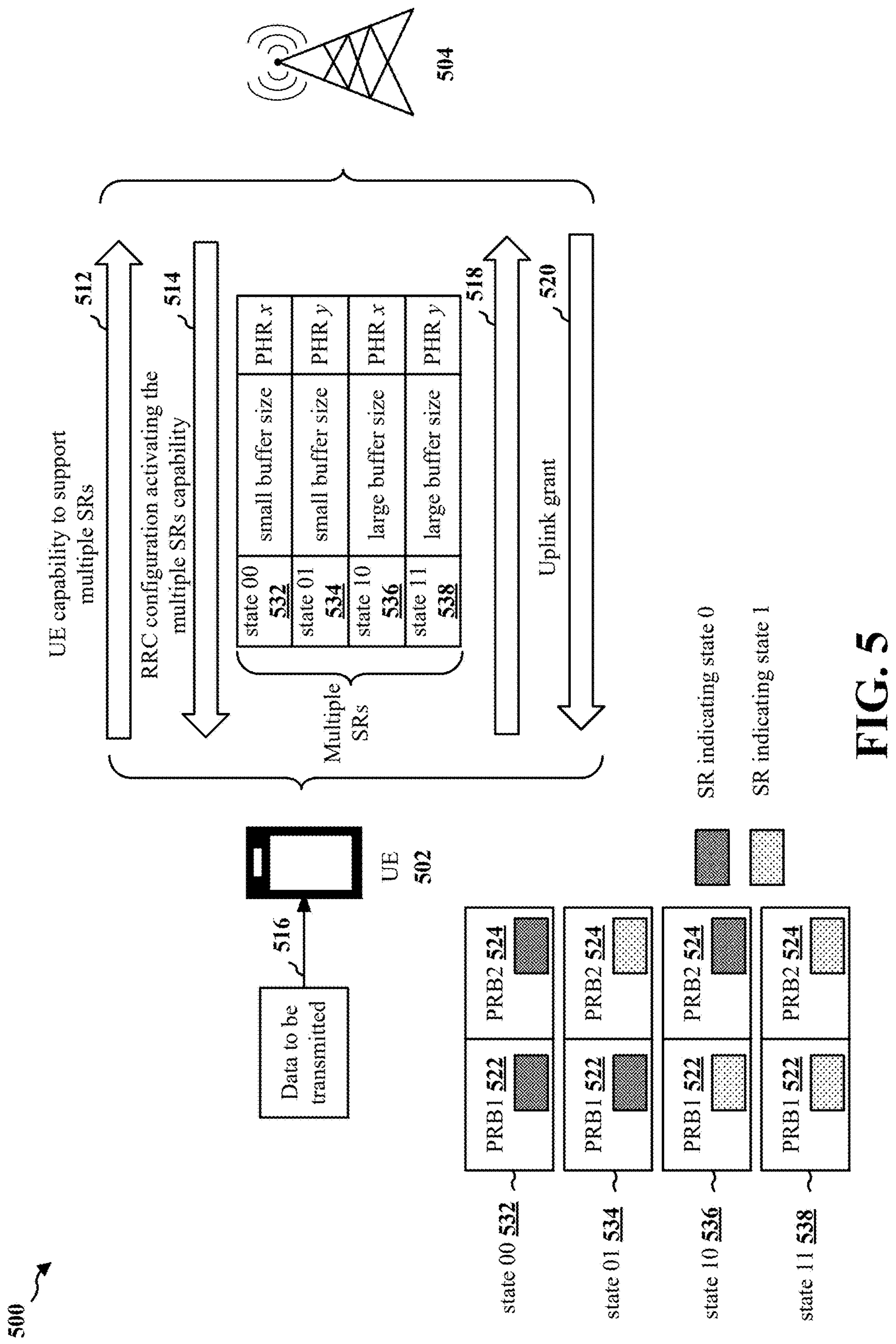
FIG. 5 is a diagram illustrating the use of multiple SRs in frequency domain or code domain in accordance with various aspects of the present disclosure.

FIG. 5 is a diagram 500 illustrating the use of multiple SRs in the frequency domain or code domain in accordance with various aspects of the present disclosure. As used herein, "multiple SRs in the code domain" refers to multiple SRs with different phase rotations, such as the different phase rotations of the SRs shown in diagram 450. As shown in FIG. 5, the UE 502 may, at 512, indicate its capability to support multiple SRs to the base station 504. At 514, upon receiving the UE's capability report, the base station 504 may send an RRC configuration to activate the multiple SRs capability. After the RRC activation (at 514) and upon the arrival of the data (at 516) into the buffer of the UE 502, the UE may, at 518, send multiple SRs to the base station 504 to request an uplink grant for the transmission of the data. These multiple SRs may be located on different PRBs (in the frequency domain) or the same PRBs but with different phase rotations (in the code domain). In some examples, these multiple SRs may be located in the same time slot. In some examples, these multiple SRs may be respectively located in different time slots. Each combination of the multiple SRs may carry additional information related to the UE (e.g., the buffer size of the UE, radio frequency condition, and power headroom of the UE) to the base station 504 to allow the base station 504 to allocate an uplink grant, at 520, more efficiently.

For example, in an example of UE transmitting two SRs in two different, consecutive PRBs (e.g., PRB1 522 and PRB2 524), four states may be indicated through the combination of these two SRs. For example, as shown in FIG. 5, the SR in the first PRB (e.g., PRB1 522) and the SR in the second PRB (e.g., PRB2 524) may each indicate one of two states (e.g., state 0 or state 1). The combination of these two SRs may indicate four states. The first state (e.g., state 00 532) may indicate a first buffer size (e.g., small buffer size) and a first power headroom (e.g., PHR x), the second state (e.g., state 01 534) may indicate the first buffer size (e.g., small buffer size) and a second power headroom (e.g., PHR y), the third state (e.g., state 10 536) may indicate the second buffer size (e.g., large buffer size) and the first power headroom (e.g., PHR x), and the fourth state (e.g., state 11 538) may indicate the second buffer size (e.g., large buffer size) and the second power headroom (e.g., PHR y).

These multiple SRs allow the base station 504 to allocate an uplink grant with greater precision. For example, when the base station 504 detects one combination of these multiple SRs from the UE 502, it can tailor the allocation of uplink PRBs, the modulation and coding schemes (MCS), and the MIMO layer based on the information signaled by the UE 502 via the combination of the multiple SRs. This precise allocation may minimize issues, such as excessive padding when the grant is too large or increased latency due to multiple uplink grants when the buffer size is underestimated. For example, if the combination of the multiple SRs from the UE 502 (e.g., at 518) indicates a small buffer size and bad radio frequency condition, the base station 504 might allocate fewer PRBs with a lower MCS at 520. On the other hand, if the combination of the multiple SRs from the UE 502 (e.g., at 518) indicates a large buffer size and good radio frequency condition, the base station 504 may allocate more PRBs with a higher MCS.

Figure 6:
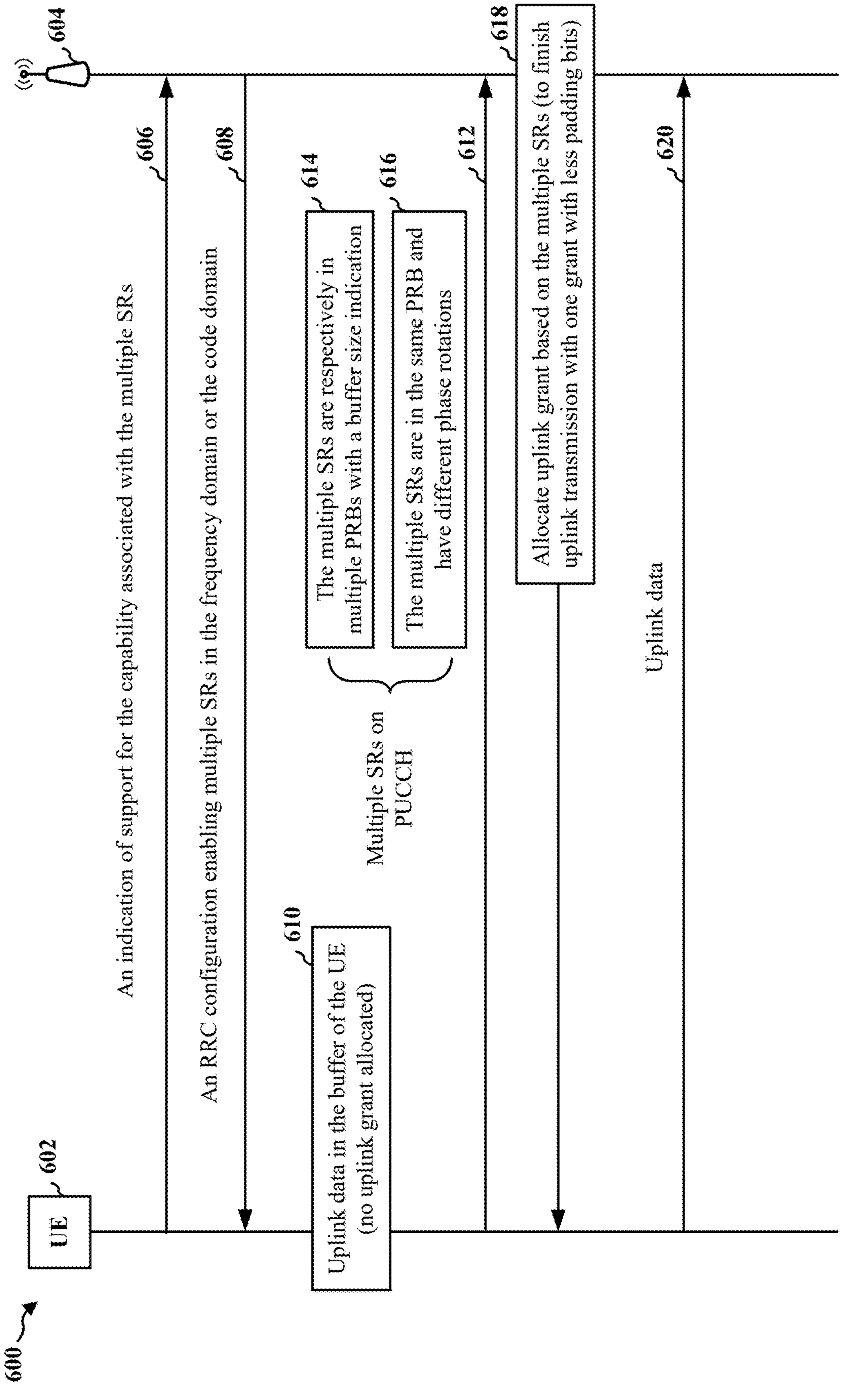
FIG. 6 is a call flow diagram illustrating a method of wireless communication in accordance with various aspects of the present disclosure.

FIG. 6 is a call flow diagram 600 illustrating a method of wireless communication in accordance with various aspects of this present disclosure. Various aspects are described in connection with a UE 602 and a base station 604. The aspects may be performed by the UE 602 or the base station 604 in aggregation and/or by one or more components of a base station 604 (e.g., a CU 110, a DU 130, and/or an RU 140).

As shown in FIG. 6, at 606, a UE 602 may transmit, to the base station 604, an indication of the support for the capability associated with the multiple SRs. For example, referring to FIG. 5, the UE 502 may, at 512, transmit to the base station 504 an indication of the UE capability to support multiple SRs. The multiple SRs may be in the frequency domain or the code domain. For example, the multiple SRs may be in different PRBs (in the frequency domain) or in the same PRBs but with different phase rotations (in the code domain).

At 608, the UE 602 may receive from the base station 604 an RRC configuration enabling multiple SRs in the frequency domain or the code domain. For example, referring to FIG. 5, the UE 502 may receive, at 514, from the base station 504 an RRC configuration activating the multiple SRs capability.

At 610, the uplink data may arrive in the buffer of the UE 602, and the UE 602 may not have allocated an uplink grant for the uplink data at this time.

At 612, based on the arrival of the uplink data and the lack of an allocated uplink grant (at 610), the UE 602 may transmit multiple SRs on PUCCH to the base station 604. In some examples, the multiple SRs may be respectively in multiple PRBs with a buffer size indication (at 614). In some examples, the multiple SRs may be in the same PRB and may have different phase rotations (at 616). In some examples, the multiple SRs may be located in the same time slot. In some examples, the multiple SRs may be respectively located in different time slots. For example, referring to FIG. 5, when the multiple SRs are in different PRBs, the combination of the multiple SRs may indicate information related to the buffer size (e.g., large or small buffer size) and the power headroom (e.g., PHR x or PHR y).

At 618, upon receiving the multiple SRs at 612, the base station 604 may allocate an uplink grant based on the combination of the multiple SRs. Based on the information on the combination of the multiple SRs (at 612), the base station may allocate the uplink grant so that the transmission of the uplink data may be completed with one uplink grant with minimum padding bits. For example, the transport block size, the MCS, and the MIMO layer associated with the one uplink grant may be based on the combination of the multiple SRs.

At 620, upon receiving the allocated uplink grant (at 618), the UE 602 may transmit the uplink data to the base station 604 using the allocated uplink grant.

Figure 7:
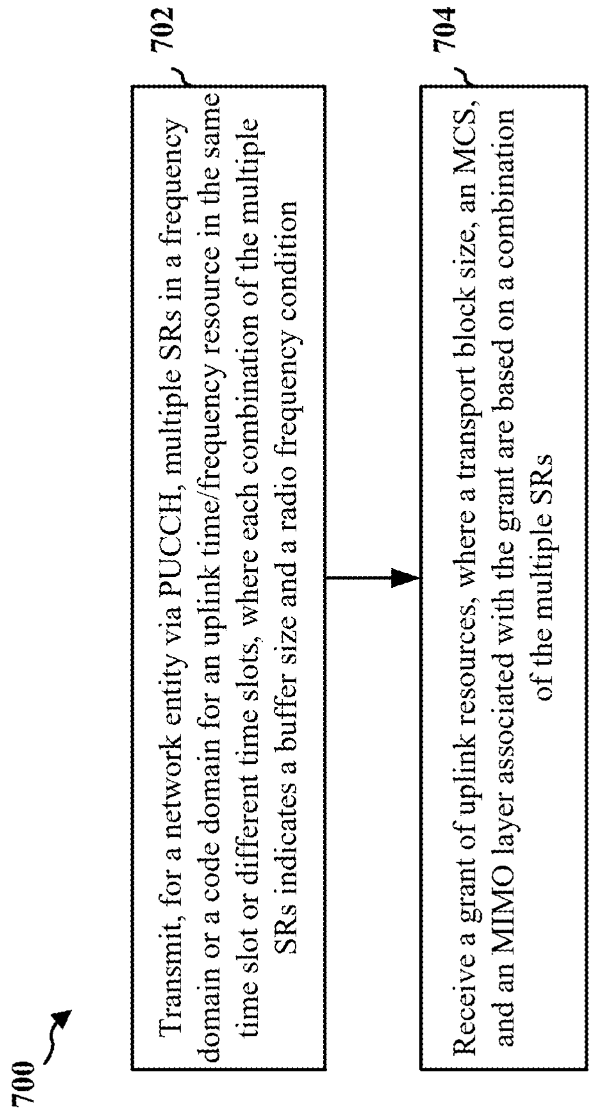
FIG. 7 is a flowchart illustrating methods of wireless communication at a UE in accordance with various aspects of the present disclosure.

FIG. 7 is a flowchart 700 illustrating methods of wireless communication at a UE in accordance with various aspects of the present disclosure. The method may be performed by a UE. The UE may be the UE 104, 350, 502, 602, or the apparatus 904 in the hardware implementation of FIG. 9. In some examples, by enabling UE to send enhanced SRs that include information about buffer size and radio frequency (RF) conditions, such as PHR indications on the PUCCH, the methods allow the network to allocate the uplink grant more accurately, thereby improving the efficiency of resources utilization and reducing the latency. In some examples, with the indication of buffer size and RF conditions, the network can allocate the exact amount of resources needed, avoiding the common issue of over or under-allocating PRBs, which may result in high padding rates or multiple uplink grants.

As shown in FIG. 7, at 702, the UE may transmit, for a network entity via PUCCH, multiple SRs in a frequency domain or a code domain for an uplink time/frequency resource in the same time slot or different time slots. Each combination of the multiple SRs may indicate a buffer size and a radio frequency condition. The network entity may be a base station, or a component of a base station, in the access network of FIG. 1 or a core network component (e.g., base station 102, 310, 504, 604; or the network entity 902 in the hardware implementation of FIG. 9). FIG. 5 and FIG. 6 illustrate various aspects of the steps in connection with flowchart 700. For example, referring to FIG. 6, the UE 602 may transmit, at 612, for a network entity (base station 604) via PUCCH, multiple SRs in a frequency domain or a code domain for an uplink time/frequency resource in the same time slot or different time slots. Referring to FIG. 5, the UE 502 may, at 518, send multiple SRs to the base station 504 to request an uplink grant for the transmission of the data. These multiple SRs may be located on different PRBs (in the frequency domain) or the same PRBs but with different phase rotations (in the code domain). In some aspects, 702 may be performed by the scheduling request component 198.

At 704, the UE may receive a grant of uplink resources, where the transport block size, the MCS, and the MIMO layer associated with the grant may be based on the multiple SRs. For example, referring to FIG. 6, the UE 602 may receive, at 618, a grant of uplink resources. Referring to FIG. 5, if the combination of the multiple SRs from the UE 502 (e.g., at 518) indicates a small buffer size and bad radio frequency condition, the base station 504 might allocate fewer PRBs with a lower MCS at 520. On the other hand, if the combination of the multiple SRs from the UE 502 (e.g., at 518) indicates a large buffer size and good radio frequency condition, the base station 504 may allocate more PRBs with a higher MCS. In some aspects, 704 may be performed by the scheduling request component 198.

In some aspects, the UE may transmit, using the grant of the uplink resources, uplink data to the network entity. For example, referring to FIG. 6, the UE 602 may transmit, at 620, using the grant of the uplink resources, uplink data to the network entity (base station 604).

In some aspects, to transmit the multiple SRs, the UE may transmit the multiple SRs based on one or more of: the data size of the uplink data in a buffer of the UE, or the radio frequency condition. For example, referring to FIG. 6, the UE 602 may transmit, at 612, the multiple SRs based on one or more of: the data size of the uplink data in a buffer of the UE 602 (at 610) or the radio frequency condition.

In some aspects, the UE may transmit an indication of support for the capability associated with the multiple SRs. For example, referring to FIG. 6, the UE 602 may transmit, at 606, an indication of support for the capability associated with the multiple SRs. Referring to FIG. 5, the UE 502 may, at 512, transmit to the base station 504 an indication of the UE capability to support multiple SRs.

In some aspects, the UE may receive, prior to transmitting the multiple SRs, an RRC configuration enabling multiple SRs in the frequency domain or the code domain in the same time slot or the different time slots. For example, referring to FIG. 6, the UE 602 may receive, at 608, an RRC configuration enabling multiple SRs in the frequency domain or the code domain in the same time slot or the different time slots.

In some aspects, the multiple SRs may be located on multiple SR occasions in the frequency domain with different PRBs or the code domain with different phase rotations in the same time slot or different time slots. For example, referring to FIG. 6, the multiple SRs (at 612) may be located on multiple SR occasions in the frequency domain (e.g., located on multiple PRBs at 614) or the code domain (e.g., located on the same PRB but with different phase rotations at 616) in the same time slot or different time slots.

In some aspects, each combination of the multiple SRs may indicate a power headroom for the UE. For example, referring to FIG. 5, each combination of the multiple SRs (at 518) may indicate a power headroom (e.g., PHR x or PHR y) for the UE 502.

In some aspects, the multiple SRs may be respectively in multiple PRBs with a buffer size indication. For example, referring to FIG. 6, the multiple SRs may be respectively in multiple PRBs with a buffer size indication (at 614). Referring to FIG. 5, the multiple SRs (at 518) may be respectively in multiple PRBs with a buffer size indication (e.g., indicating a small buffer size or a large buffer size).

In some aspects, the multiple SRs may indicate one of: a first buffer size with a first power headroom, the first buffer size with a second power headroom different from the first power headroom, a second buffer size that is larger than the first buffer size and with the first power headroom, or the second buffer size with the second power headroom. For example, referring to FIG. 5, the multiple SRs (at 518) may indicate one of: a first buffer size (e.g., small buffer size) with a first power headroom (e.g., PHR x) for state 00 532, the first buffer size (e.g., small buffer size) with a second power headroom (e.g., PHR y) different from the first power headroom (e.g., PHR x) at state 01 534, a second buffer size (e.g., large buffer size) that is larger than the first buffer size (e.g., small buffer size) and with the first power headroom (e.g., PHR x) at state 10 536, or the second buffer size (e.g., small buffer size) with the second power headroom (e.g., PHR y) at state 11 538.

In some aspects, the multiple SRs may be in the same PRB, and the multiple SRs may have the same code with different phase rotations or different codes with the same phase rotation. For example, referring to FIG. 6, the multiple SRs may be in the same PRB and may have different phase rotations (at 616).

Figure 8:
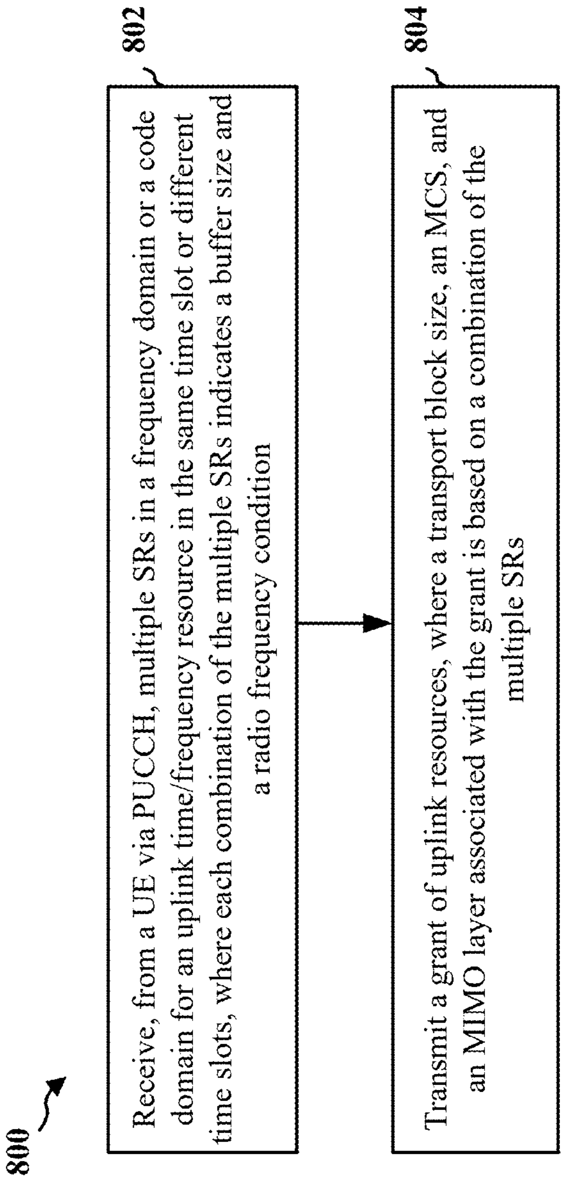
FIG. 8 is a flowchart illustrating methods of wireless communication at a network entity in accordance with various aspects of the present disclosure.

FIG. 8 is a flowchart 800 illustrating methods of wireless communication at a network entity in accordance with various aspects of the present disclosure. The method may be performed by a network entity. The network entity may be a base station, or a component of a base station, in the access network of FIG. 1 or a core network component (e.g., base station 102, 310, 504, 604; or the network entity 902 in the hardware implementation of FIG. 9). In some examples, by enabling UE to send enhanced SRs that include information about buffer size and radio frequency (RF) conditions, such as PHR indications on the PUCCH, the methods allow the network to allocate the uplink grant more accurately, thereby improving the efficiency of resources utilization and reducing the latency. In some examples, with the indication of buffer size and RF conditions, the network can allocate the exact amount of resources needed, avoiding the common issue of over or under-allocating PRBs, which may result in high padding rates or the need for multiple uplink grants.

As shown in FIG. 8, at 802, the network entity may receive, from a UE via PUCCH, multiple SRs in a frequency domain or a code domain for an uplink time/frequency resource in the same time slot or different time slots. Each combination of the multiple SRs may indicate a buffer size and a radio frequency condition. The UE may be the UE 104, 350, 502, 602, or the apparatus 904 in the hardware implementation of FIG. 9. FIG. 5 and FIG. 6 illustrate various aspects of the steps in connection with flowchart 800. For example, referring to FIG. 6, the network entity (base station 604) may, at 612, receive, from a UE via PUCCH, multiple SRs in a frequency domain or a code domain for an uplink time/frequency resource. Referring to FIG. 5, the base station 504 may, at 518, receive multiple SRs from the UE 502. These multiple SRs may be located on different PRBs (in the frequency domain) or the same PRBs but with different phase rotations (in the code domain) in the same time slot or different time slots. In some aspects, 802 may be performed by the scheduling request component 199.

At 804, the network entity may transmit a grant of uplink resources. The transport block size, the MCS, and the MIMO layer associated with the grant may be based on a combination of the multiple SRs. For example, referring to FIG. 6, the network entity (base station 604) may, at 618, transmit a grant of uplink resources. Referring to FIG. 5, if a combination of the multiple SRs from the UE 502 (e.g., at 518) indicates a small buffer size and bad radio frequency condition, the base station 504 might allocate fewer PRBs with a lower MCS at 520. On the other hand, if a combination of the multiple SRs from the UE 502 (e.g., at 518) indicates a large buffer size and good radio frequency condition, the base station 504 may allocate more PRBs with a higher MCS. In some aspects, 804 may be performed by the scheduling request component 199.

In some aspects, the network entity may receive, via the grant of the uplink resources, uplink data from the UE. For example, referring to FIG. 6, the network entity (base station 604) may, at 620, receive, via the grant of the uplink resources, uplink data from the UE 602.

In some aspects, the network entity may receive, from the UE, an indication of support for a capability associated with the multiple SRs. For example, referring to FIG. 6, the network entity (base station 604) may, at 606, receive, from the UE 602, an indication of support for a capability associated with the multiple SRs.

In some aspects, the network entity may transmit an RRC configuration enabling multiple SRs in the frequency domain or the code domain in the same time slot or the different time slots. For example, referring to FIG. 6, the network entity (base station 604) may, at 608, transmit an RRC configuration enabling multiple SRs in the frequency domain or the code domain in the same time slot or the different time slots.

In some aspects, the multiple SRs may be located on multiple SR occasions in the frequency domain with different PRBs or the code domain with different phase rotations in the same time slot or the different time slots. For example, referring to FIG. 6, the multiple SRs (at 612) may be located on multiple SR occasions in the frequency domain (e.g., located on multiple PRBs at 614) or the code domain (e.g., located on the same PRB but with different phase rotations at 616) in the same time slot or the different time slots.

In some aspects, each combination of the multiple SRs may indicate a power headroom for the UE. For example, referring to FIG. 5, each combination of the multiple SRs (at 518) may indicate a power headroom (e.g., PHR x or PHR y) for the UE 502.

In some aspects, the multiple SRs may be respectively in multiple PRBs with a buffer size indication. For example, referring to FIG. 6, the multiple SRs may be respectively in multiple PRBs with a buffer size indication (at 614). Referring to FIG. 5, the multiple SRs (at 518) may be respectively in multiple PRBs with a buffer size indication (e.g., indicating a small buffer size or a large buffer size).

In some aspects, the multiple SRs may indicate one of: a first buffer size with a first power headroom, the first buffer size with a second power headroom different from the first power headroom, a second buffer size that is larger than the first buffer size with the first power headroom, or the second buffer size with the second power headroom. For example, referring to FIG. 5, the multiple SRs (at 518) may indicate one of: a first buffer size (e.g., small buffer size) with a first power headroom (e.g., PHR x) for state 00 532, the first buffer size (e.g., small buffer size) with a second power headroom (e.g., PHR y) different from the first power headroom (e.g., PHR x) at state 01 534, a second buffer size (e.g., large buffer size) that is larger than the first buffer size (e.g., small buffer size) and with the first power headroom (e.g., PHR x) at state 10 536, or the second buffer size (e.g., small buffer size) with the second power headroom (e.g., PHR y) at state 11 538.

In some aspects, the multiple SRs may be in the same PRB, and the multiple SRs may have the same code with different phase rotations or different codes with the same phase rotations. For example, referring to FIG. 6, the multiple SRs may be in the same PRB and may have different phase rotations (at 616).

Figure 9:
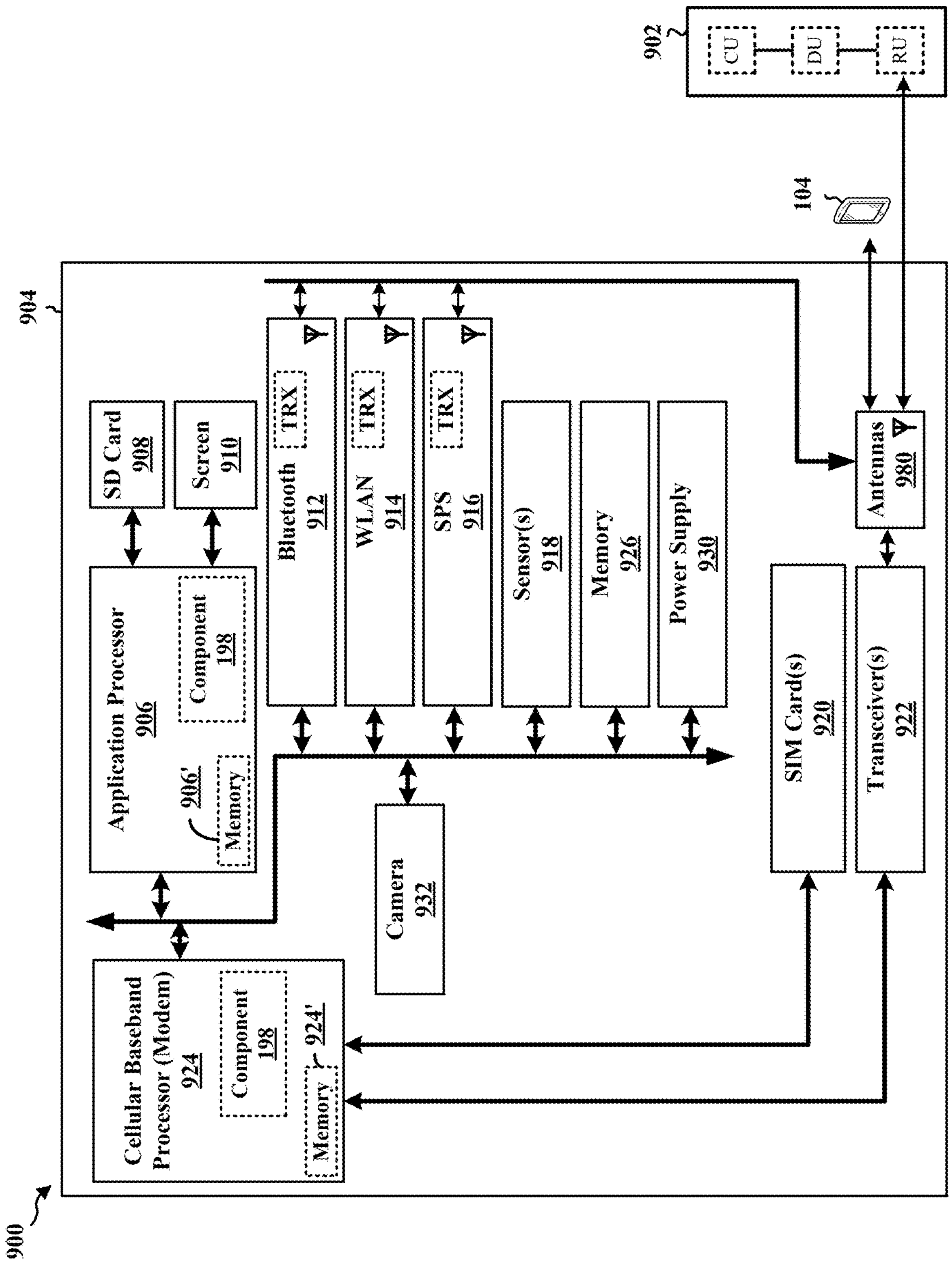
FIG. 9 is a diagram illustrating an example of a hardware implementation for an example apparatus and/or UE.

FIG. 9 is a diagram 900 illustrating an example of a hardware implementation for an apparatus 904. The apparatus 904 may be a UE, a component of a UE, or may implement UE functionality. In some aspects, the apparatus 904 may include at least one cellular baseband processor (or processing circuitry) 924 (also referred to as a modem) coupled to one or more transceivers 922 (e.g., cellular RF transceiver). The cellular baseband processor(s) (or processing circuitry) 924 may include at least one on-chip memory (or memory circuitry) 924'. In some aspects, the apparatus 904 may further include one or more subscriber identity modules (SIM) cards 920 and at least one application processor (or processing circuitry) 906 coupled to a secure digital (SD) card 908 and a screen 910. The application processor(s) (or processing circuitry) 906 may include on-chip memory (or memory circuitry) 906'. In some aspects, the apparatus 904 may further include a Bluetooth module 912, a WLAN module 914, an SPS module 916 (e.g., GNSS module), one or more sensor modules 918 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 926, a power supply 930, and/or a camera 932. The Bluetooth module 912, the WLAN module 914, and the SPS module 916 may include an on-chip transceiver (TRX) (or in some cases, just a receiver (RX)). The Bluetooth module 912, the WLAN module 914, and the SPS module 916 may include their own dedicated antennas and/or utilize the antennas 980 for communication. The cellular baseband processor(s) (or processing circuitry) 924 communicates through the transceiver(s) 922 via one or more antennas 980 with the UE 104 and/or with an RU associated with a network entity 902. The cellular baseband processor(s) (or processing circuitry) 924 and the application processor(s)

(or processing circuitry) 906 may each include a computer-readable medium/memory (or memory circuitry) 924', 906', respectively. The additional memory modules 926 may also be considered a computer-readable medium/memory (or memory circuitry). Each computer-readable medium/memory (or memory circuitry) 924', 906', 926 may be non-transitory. The cellular baseband processor(s) (or processing circuitry) 924 and the application processor(s) (or processing circuitry) 906 are each responsible for general processing, including the execution of software stored on the computer-readable medium/memory (or memory circuitry). The software, when executed by the cellular baseband processor(s) (or processing circuitry) 924/application processor(s) (or processing circuitry) 906, causes the cellular baseband processor(s) (or processing circuitry) 924/application processor(s) (or processing circuitry) 906 to perform the various functions described supra. The cellular baseband processor(s) (or processing circuitry) 924 and the application processor(s) (or processing circuitry) 906 are configured to perform the various functions described supra based at least in part of the information stored in the memory (or memory circuitry). That is, the cellular baseband processor(s) (or processing circuitry) 924 and the application processor(s) (or processing circuitry) 906 may be configured to perform a first subset of the various functions described supra without information stored in the memory and may be configured to perform a second subset of the various functions described supra based on the information stored in the memory. The computer-readable medium/memory (or memory circuitry) may also be used for storing data that is manipulated by the cellular baseband processor(s) (or processing circuitry) 924/application processor(s) (or processing circuitry) 906 when executing software. The cellular baseband processor(s) (or processing circuitry) 924/application processor(s) (or processing circuitry) 906 may be a component of the UE 350 and may include the at least one memory 360 and/or at least one of the TX processor 368, the RX processor 356, and the controller/processor 359. In one configuration, the apparatus 904 may be at least one processor chip (modem and/or application) and include just the cellular baseband processor(s) (or processing circuitry) 924 and/or the application processor(s) (or processing circuitry) 906, and in another configuration, the apparatus 904 may be the entire UE (e.g., see UE 350 of FIG. 3) and include the additional modules of the apparatus 904.

As discussed supra, the component 198 may be configured to transmit, for a network entity via PUCCH, multiple SRs in a frequency domain or a code domain for an uplink time/frequency resource, where each combination of the multiple SRs indicates a buffer size and a radio frequency condition; and receive a grant of uplink resources, where the transport block size and the MCS associated with the grant are based on a combination of the multiple SRs. The component 198 may be further configured to perform any of the aspects described in connection with the flowchart in FIG. 7, and/or performed by the UE 602 in FIG. 6. The component 198 may be within the cellular baseband processor(s) (or processing circuitry) 924, the application processor(s) (or processing circuitry) 906, or both the cellular baseband processor(s) (or processing circuitry) 924 and the application processor(s) (or processing circuitry) 906. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. As shown, the apparatus 904 may include a variety of components configured for various functions. In one configuration, the apparatus 904, and in particular the cellular baseband processor(s) (or processing circuitry) 924 and/or the application processor(s) (or processing circuitry) 906, includes means for transmitting, for a network entity via PUCCH, multiple SRs in a frequency domain or a code domain for an uplink time/frequency resource, where each combination of the multiple SRs indicates a buffer size and a radio frequency condition; and means for receiving a grant of uplink resources, where the transport block size and the MCS associated with the grant are based on a combination of the multiple SRs. The apparatus 904 may further include means for performing any of the aspects described in connection with the flowchart in FIG. 7, and/or aspects performed by the UE 602 in FIG. 6. The means may be the component 198 of the apparatus 904 configured to perform the functions recited by the means. As described supra, the apparatus 904 may include the TX processor 368, the RX processor 356, and the controller/processor 359. As such, in one configuration, the means may be the TX processor 368, the RX processor 356, and/or the controller/processor 359 configured to perform the functions recited by the means.

Figure 10:
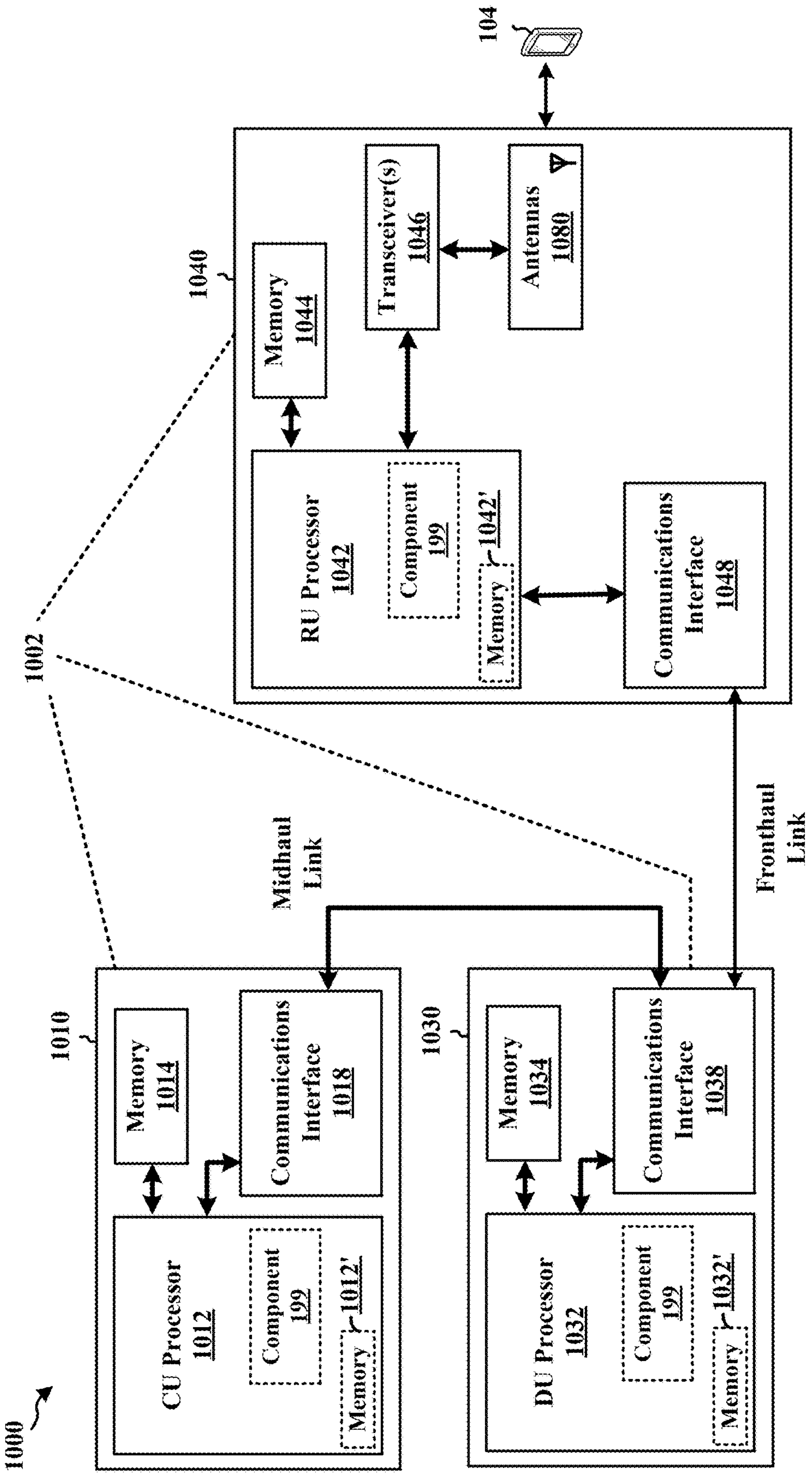
FIG. 10 is a diagram illustrating an example of a hardware implementation for an example network entity.

FIG. 10 is a diagram 1000 illustrating an example of a hardware implementation for a network entity 1002. The network entity 1002 may be a BS, a component of a BS, or may implement BS functionality. The network entity 1002 may include at least one of a CU 1010, a DU 1030, or an RU 1040. For example, depending on the layer functionality handled by the component 199, the network entity 1002 may include the CU 1010; both the CU 1010 and the DU 1030; each of the CU 1010, the DU 1030, and the RU 1040; the DU 1030; both the DU 1030 and the RU 1040; or the RU 1040. The CU 1010 may include at least one CU processor (or processing circuitry) 1012. The CU processor(s) (or processing circuitry) 1012 may include on-chip memory (or memory circuitry) 1012'. In some aspects, the CU 1010 may further include additional memory modules 1014 and a communications interface 1018. The CU 1010 communicates with the DU 1030 through a midhaul link, such as an F1 interface. The DU 1030 may include at least one DU processor (or processing circuitry) 1032. The DU processor(s) (or processing circuitry) 1032 may include on-chip memory (or memory circuitry) 1032'. In some aspects, the DU 1030 may further include additional memory modules 1034 and a communications interface 1038. The DU 1030 communicates with the RU 1040 through a fronthaul link. The RU 1040 may include at least one RU processor (or processing circuitry) 1042. The RU processor(s) (or processing circuitry) 1042 may include on-chip memory (or memory circuitry) 1042'. In some aspects, the RU 1040 may further include additional memory modules 1044, one or more transceivers 1046, antennas 1080, and a communications interface 1048. The RU 1040 communicates with the UE 104. The on-chip memory (or memory circuitry) 1012', 1032', 1042' and the additional memory modules 1014, 1034, 1044 may each be considered a computer-readable medium/memory (or memory circuitry). Each computer-readable medium/memory (or memory circuitry) may be non-transitory. Each of the processors (or processing circuitry) 1012, 1032, 1042 is responsible for general processing, including the execution of software stored on the computer-readable medium/memory (or memory circuitry). The software, when executed by the corresponding processor(s) (or processing circuitry) causes the processor(s) (or processing circuitry) to perform the various functions described supra. The computer-readable medium/memory (or memory circuitry) may also be used for storing data that is manipulated by the processor(s) (or processing circuitry) when executing software.

As discussed supra, the component 199 may be configured to receive, from a UE via PUCCH, multiple SRs in a frequency domain or a code domain for an uplink time/frequency resource, where each combination of the multiple SRs indicates a buffer size and a radio frequency condition; and transmit a grant of uplink resources, where the transport block size and the MCS associated with the grant is based on the a combination of multiple SRs. The component 199 may be further configured to perform any of the aspects described in connection with the flowchart in FIG. 8, and/or performed by the base station 604 in FIG. 6. The component 199 may be within one or more processors (or processing circuitry) of one or more of the CU 1010, DU 1030, and the RU 1040. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. The network entity 1002 may include a variety of components configured for various functions. In one configuration, the network entity 1002 includes means for receiving, from a UE via PUCCH, multiple SRs in a frequency domain or a code domain for an uplink time/frequency resource, where each combination of the multiple SRs indicates a buffer size and a radio frequency condition; and means for transmitting a grant of uplink resources, where the transport block size and the MCS associated with the grant is based on a combination of the multiple SRs. The network entity 1002 may further include means for performing any of the aspects described in connection with the flowchart in FIG. 8, and/or aspects performed by the base station 604 in FIG. 6. The means may be the component 199 of the network entity 1002 configured to perform the functions recited by the means. As described supra, the network entity 1002 may include the TX processor 316, the RX processor 370, and the controller/processor 375. As such, in one configuration, the means may be the TX processor 316, the RX processor 370, and/or the controller/processor 375 configured to perform the functions recited by the means.

This disclosure provides a method for wireless communication at a UE. The method may include transmitting, for a network entity via PUCCH, multiple SRs in a frequency domain or a code domain for an uplink time/frequency resource, where each combination of the multiple SRs indicates a buffer size and a radio frequency condition; and receive a grant of uplink resources, where the transport block size and the MCS associated with the grant are based on a combination of the multiple SRs. In some examples, by enabling UE to send enhanced SRs that include information about buffer size and radio frequency (RF) conditions, such as PHR indications on the PUCCH, the methods allow the network to allocate the uplink grant more accurately, thereby improving the efficiency of resources utilization and reducing the latency. In some examples, with the indication of buffer size and RF conditions, the network can allocate the exact amount of resources needed, avoiding the common issue of over or under-allocating PRBs, which may result in high padding rates or the need for multiple uplink grants.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. When at least one processor is configured to perform a set of functions, the at least one processor, individually or in any combination, is configured to perform the set of functions. Accordingly, each processor of the at least one processor may be configured to perform a particular subset of the set of functions, where the subset is the full set, a proper subset of the set, or an empty subset of the set. A processor may be referred to as processor circuitry. A memory/memory module may be referred to as memory circuitry. If a first apparatus receives data from or transmits data to a second apparatus, the data may be received/transmitted directly between the first and second apparatuses, or indirectly between the first and second apparatuses through a set of apparatuses. A device configured to "output" data or "provide" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a UE. The method includes transmitting, for a network entity via physical uplink control channel (PUCCH), multiple scheduling requests (SRs) in a frequency domain or a code domain for an uplink time/frequency resource in a same time slot or different time slots, wherein each combination of the multiple SRs indicates a buffer size and a radio frequency condition; and receiving a grant of uplink resources, wherein a transport block size, a modulation and coding scheme (MCS), and a multiple-input and multiple-output (MIMO) layer associated with the grant are based on a combination of the multiple SRs.

Aspect 2 is the method of aspect 1, where the method further includes transmitting, using the grant of the uplink resources, uplink data to the network entity.

Aspect 3 is the method of any of aspects 1 to 2, wherein transmitting the multiple SRs comprises: transmitting the multiple SRs based one or more of: a data size of the uplink data in a buffer of the UE, or the radio frequency condition.

Aspect 4 is the method of any of aspects 1 to 3, where the method further includes transmitting an indication of support for a capability associated with the multiple SRs.

Aspect 5 is the method of aspect 4, where the method includes receiving, prior to transmitting the multiple SRs, a radio resource control (RRC) configuration enabling the multiple SRs in the frequency domain or the code domain in the same time slot or different time slots.

Aspect 6 is the method of any of aspects 1 to 5, wherein the multiple SRs are located on multiple SR occasions in the frequency domain with different physical resource blocks (PRBs) or the code domain with different phase rotations in the same time slot or different time slots.

Aspect 7 is the method of any of aspects 1 to 5, wherein each combination of the multiple SRs indicates a power headroom for the UE.

Aspect 8 is the method of any of aspects 1 to 5, wherein the multiple SRs are respectively in multiple physical resource blocks (PRBs) with a buffer size indication.

Aspect 9 is the method of aspect 8, wherein the multiple SRs indicate one of: a first buffer size with a first power headroom, the first buffer size with a second power headroom different from the first power headroom, a second buffer size that is larger than the first buffer size and with the first power headroom, or the second buffer size with the second power headroom.

Aspect 10 is the method of any of aspects 1 to 9, wherein the multiple SRs are in a same physical resource block (PRB) and the multiple SRs have a same code with different phase rotations or different codes with a same phase rotation.

Aspect 11 is an apparatus for wireless communication at a UE, comprising: a processing system that includes processor circuitry and memory circuitry that stores code and is coupled with the processor circuitry, the processing system configured to cause the UE to perform the method of one or more of aspects 1-10.

Aspect 12 is an apparatus for wireless communication at a UE, comprising: at least one memory; and at least one processor coupled to the at least one memory and, where the at least one processor, individually or in any combination, is configured to perform the method of any of aspects 1-10.

Aspect 13 is the apparatus for wireless communication at a UE, comprising means for performing each step in the method of any of aspects 1-10.

Aspect 14 is an apparatus of any of aspects 11-13, further comprising a transceiver configured to receive or to transmit in association with the method of any of aspects 1-10.

Aspect 15 is a computer-readable medium (e.g., a non-transitory computer-readable medium) storing computer executable code at a UE, the code when executed by at least one processor causes the at least one processor to, individually or in any combination, perform the method of any of aspects 1-10.

Aspect 16 is a method of wireless communication at a network entity. The method includes receiving, from a user equipment (UE) via physical uplink control channel (PUCCH), multiple scheduling requests (SRs) in a frequency domain or a code domain for an uplink time/frequency resource in a same time slot or different time slots, wherein each combination of the multiple SRs indicates a buffer size and a radio frequency condition; and transmitting a grant of uplink resources, wherein a transport block size, a modulation and coding scheme (MCS), and a multiple-input and multiple-output (MIMO) layer associated with the grant is based on a combination of the multiple SRs.

Aspect 17 is the method of aspect 16, where the method further includes receiving, via the grant of the uplink resources, uplink data from the UE.

Aspect 18 is the method of any of aspects 16 to 17, where the method further includes receiving, from the UE, an indication of support for a capability associated with the multiple SRs.

Aspect 19 is the method of aspect 18, where the method further includes transmitting a radio resource control (RRC) configuration enabling the multiple SRs in the frequency domain or the code domain in the same time slot or the different time slots.

Aspect 20 is the method of any of aspects 16 to 19, wherein the multiple SRs are located on multiple SR occasions in the frequency domain with different physical resource blocks (PRBs) or the code domain with different phase rotations in the same time slot or the different time slots.

Aspect 21 is the method of any of aspects 16 to 19, wherein each combination of the multiple SRs indicates a power headroom for the UE.

Aspect 22 is the method of any of aspects 16 to 19, wherein the multiple SRs are respectively in multiple physical resource blocks (PRBs) with a buffer size indication.

Aspect 23 is the method of aspect 22, wherein the multiple SRs indicate one of: a first buffer size with a first power headroom, the first buffer size with a second power headroom different from the first power headroom, a second buffer size that is larger than the first buffer size with the first power headroom, or the second buffer size with the second power headroom.

Aspect 24 is the method of any of aspects 16 to 23, wherein the multiple SRs are in a same physical resource block (PRB), and the multiple SRs have a same code with different phase rotations or different codes with a same phase rotations.

Aspect 25 is an apparatus for wireless communication at a network entity, comprising: a processing system that includes processor circuitry and memory circuitry that stores code and is coupled with the processor circuitry, the processing system configured to cause the network entity to perform the method of one or more of aspects 16-24.

Aspect 26 is an apparatus for wireless communication at a network entity, comprising: at least one memory; and at least one processor coupled to the at least one memory and, where the at least one processor, individually or in any combination, is configured to perform the method of any of aspects 16-24.

Aspect 27 is the apparatus for wireless communication at a network entity, comprising means for performing each step in the method of any of aspects 16-24.

Aspect 28 is an apparatus of any of aspects 25-27, further comprising a transceiver configured to receive or to transmit in association with the method of any of aspects 16-24.

Aspect 29 is a computer-readable medium (e.g., a non-transitory computer-readable medium) storing computer executable code at a network entity, the code when executed by at least one processor causes the at least one processor to, individually or in any combination, perform the method of any of aspects 16-24.

What is claimed is:

1. An apparatus for wireless communication at a user equipment (UE), comprising:
- at least one memory; and
- at least one processor coupled to the at least one memory and, based at least in part on information stored in the at least one memory, the at least one processor is configured to cause the UE to:
  - transmit, for a network entity via physical uplink control channel (PUCCH), multiple scheduling requests (SRs) in a frequency domain or a code domain for an uplink time/frequency resource, wherein each combination of the multiple SRs indicates a buffer size and a radio frequency condition, and wherein the multiple SRs are located in a same time slot; and
  - receive a grant of uplink resources, wherein a transport block size, a modulation and coding scheme (MCS), and a multiple-input and multiple-output (MIMO) layer associated with the grant are based on a combination of the multiple SRs.

2. The apparatus of claim 1, further comprising a transceiver coupled to the at least one processor, wherein to transmit the multiple SRs, the at least one processor is configured to cause the UE to transmit the multiple SRs via the transceiver, and the at least one processor is further configured to cause the UE to:
- transmit, using the grant of the uplink resources, uplink data to the network entity.

3. The apparatus of claim 2, wherein to transmit the multiple SRs, the at least one processor is configured to cause the UE to:
- transmit the multiple SRs based on one or more of:
  - a data size of the uplink data in a buffer of the UE, or the radio frequency condition.

4. The apparatus of claim 1, wherein the at least one processor is further configured to cause the UE to:
- transmit an indication of support for a capability associated with the multiple SRs.

5. The apparatus of claim 4, wherein the at least one processor is further configured to cause the UE to:
- receive, prior to being configured to transmit the multiple SRs, a radio resource control (RRC) configuration enabling the multiple SRs in the frequency domain or the code domain in the same time slot.

6. The apparatus of claim 1, wherein the multiple SRs are located on multiple SR occasions in the frequency domain with different physical resource blocks (PRBs) or the code domain with different phase rotations in the same time slot.

7. The apparatus of claim 1, wherein each combination of the multiple SRs indicates a power headroom for the UE.

8. The apparatus of claim 1, wherein the multiple SRs are respectively in multiple physical resource blocks (PRBs) with a buffer size indication.

9. The apparatus of claim 8, wherein the multiple SRs indicate one of:
- a first buffer size with a first power headroom,
- the first buffer size with a second power headroom different from the first power headroom,
- a second buffer size that is larger than the first buffer size and with the first power headroom, or
- the second buffer size with the second power headroom.

10. The apparatus of claim 1, wherein the multiple SRs are in a same physical resource block (PRB), and the multiple SRs have a same code with different phase rotations or different codes with a same phase rotation.

11. An apparatus for wireless communication at a network entity, comprising:
- at least one memory; and
- at least one processor coupled to the at least one memory and, based at least in part on information stored in the at least one memory, the at least one processor is configured to cause the network entity to:
  - receive, from a user equipment (UE) via physical uplink control channel (PUCCH), multiple scheduling requests (SRs) in a frequency domain or a code domain for an uplink time/frequency resource, wherein each combination of the multiple SRs indicates a buffer size and a radio frequency condition, and wherein the multiple SRs are located in a same time slot; and
  - transmit a grant of uplink resources, wherein a transport block size, a modulation and coding scheme (MCS), and a multiple-input and a multiple-output (MIMO) layer associated with the grant is based on a combination of the multiple SRs.

12. The apparatus of claim 11, further comprising a transceiver coupled to the at least one processor, wherein to receive the multiple SRs, the at least one processor is configured to cause the network entity to receive the multiple SRs via the transceiver, and wherein the at least one processor is further configured to cause the network entity to:
- receive, via the grant of the uplink resources, uplink data from the UE.

13. The apparatus of claim 11, wherein the at least one processor is further configured to cause the network entity to:
- receive, from the UE, an indication of support for a capability associated with the multiple SRs.

14. The apparatus of claim 13, wherein the at least one processor is further configured to cause the network entity to:

transmit a radio resource control (RRC) configuration enabling the multiple SRs in the frequency domain or the code domain in the same time slot.

15. The apparatus of claim 11, wherein the multiple SRs are located on multiple SR occasions in the frequency domain with different physical resource blocks (PRBs) or the code domain with different phase rotations in the same time slot.

16. The apparatus of claim 11, wherein each combination of the multiple SRs indicates a power headroom for the UE.

17. The apparatus of claim 11, wherein the multiple SRs are respectively in multiple physical resource blocks (PRBs) with a buffer size indication.

18. The apparatus of claim 17, wherein the multiple SRs indicate one of:

a first buffer size with a first power headroom, the first buffer size with a second power headroom different from the first power headroom, a second buffer size that is larger than the first buffer size with the first power headroom, or the second buffer size with the second power headroom.

19. The apparatus of claim 11, wherein the multiple SRs are in a same physical resource block (PRB), and the multiple SRs have a same code with different phase rotations or different codes with a same phase rotation.

20. A method of wireless communication at a user equipment (UE), comprising:

transmitting, for a network entity via physical uplink control channel (PUCCH), multiple scheduling requests (SRs) in a frequency domain or a code domain for an uplink time/frequency resource, wherein each combination of the multiple SRs indicates a buffer size and a radio frequency condition, and wherein the multiple SRs are located in a same time slot; and receiving a grant of uplink resources, wherein a transport block size, a modulation and coding scheme (MCS), and a multiple-input and multiple-output (MIMO) layer associated with the grant are based on a combination of multiple SRs.

* * * * *